T. F. WOODWARD.
Forming Female Screw-Threads in Glass-Jars, Insulators, &c.

No. 196,733. Patented Oct. 30, 1877.

Witnesses.
S. H. Millett.
B. J. Tajman

Inventor
Theodore F. Woodward
Per Stephen Ustick atty.

UNITED STATES PATENT OFFICE.

THEODORE F. WOODWARD, OF WINSLOW, NEW JERSEY.

IMPROVEMENT IN FORMING FEMALE SCREW-THREADS IN GLASS JARS, INSULATORS, &c.

Specification forming part of Letters Patent No. 196,733, dated October 30, 1877; application filed September 22, 1877.

*To all whom it may concern:*

Be it known that I, THEODORE F. WOODWARD, of Winslow, in the county of Camden and State of New Jersey, have invented a new and useful Improvement in Forming Female Screw-Threads in Glass Jars, Insulators, Covers, &c., of which the following is a full, clear, and exact description, reference being had to the following specification and the accompanying drawings, in which—

Figure 1:
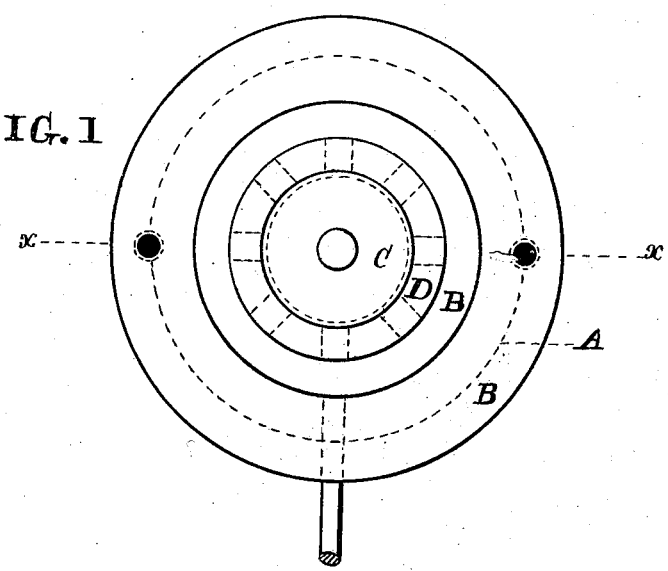
Figure 2:
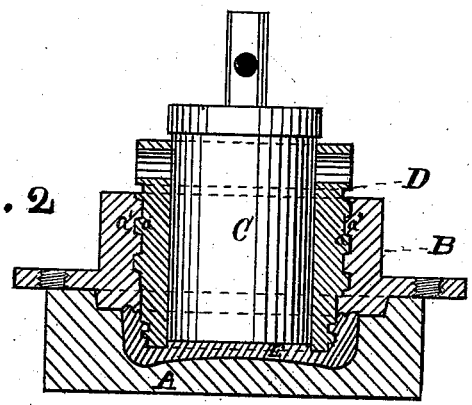
Figure 3:
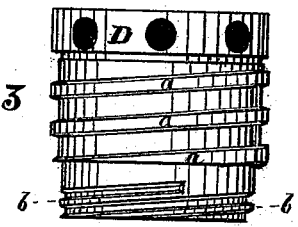

Figure 1 is a plan view of my improved device for forming covers for glass jars with female screw-threads. Fig. 2 is a vertical section at the line $x\ x$ of Fig. 1. Fig. 3 is a side elevation of the sleeve D.

Like letters of reference in all the figures indicate the same parts.

Heretofore the female screw-threads of the covers of glass jars have been formed by means of screw-threads on the periphery of the lower end of the plunger connected with the molding-machine. But great difficulty has been experienced in forming solid threads at all times in this manner, and in getting the covers of uniform thickness, on account of the plunger filling up the whole space inside of the cover, as the charge of the molten glass into the mold sometimes varies in quantity, and the whole charge is used in forming the cover. Another difficulty has been occasioned by the tendency in the unscrewing of the plunger to turn the cover around in the mold, and thus prevent the withdrawal of the plunger from the cover. These difficulties are completely overcome by my invention.

The invention consists of a sleeve which has a screw-thread, which fits a corresponding thread of the follower of the mold, whereby it is lowered into the mold previous to pressing the charge of molten glass to form the cover. The screw-threads for forming the female screw thread or threads of the cover are on the periphery of the lower end of the sleeve, instead of on the plunger, as in the ordinary manner. And the plunger is made of uniform size throughout its whole length and moves freely in a central bore of the sleeve, and when pressed downward forces the glass firmly in the space below and around the lower end of the sleeve, so as to form the cover, making that part of the latter of uniform density and thickness, and if there should be any excess of glass in the charge it will only occasion additional thickness in the portion at the end of the plunger. After the molding process the sleeve is elevated above the mold by unscrewing it before the plunger and follower are withdrawn, thus causing the plunger to exert its force upon that portion of the cover beneath it, and preventing thereby the cover turning around, as frequently occurs in the ordinary manner of molding.

In the accompanying drawings, A represents the mold, B the follower, and C the plunger, all connected with the stationary part of a molding-machine in the usual manner. My improvement relates to the sleeve D, which has a screw-thread, $a$, on its periphery, which fits a corresponding screw-thread, $a'$, in the eye of the follower $b$, as seen in Fig. 2. The diameter of the sleeve at its lower end is of corresponding size to the diameter the chamber of the cover is designed to be, and is provided with screw-threads $b\ b$, each of which runs about one-half around the circumference at opposite sides, as shown in the drawings. I design, however, constructing the sleeve sometimes with a single and continuous screw-thread, $b$, to encircle this part of the sleeve. When so constructed the pitch of the two threads $a$ and $b$ will correspond in size, but when the thread $b$ is duplicated the size of the pitch has to be reduced about one-half, as shown in the drawing, to admit of the forming screw-threads being withdrawn from the cover in the unscrewing of the sleeve from the follower.

The operation is as follows: The follower B is bolted to the press in the usual manner, and the mold A placed in its position on the bed-plate, and the follower brought into connection therewith, the mold being previously charged with the molten glass for forming the cover; then the sleeve D is brought to its lowest position, as seen in Fig. 3, for forming the cover; and then the plunger C is pressed down in the sleeve, whereby the glass is firmly pressed in the space around and beneath the lower end of the sleeve to form the cover E. If in any of the charges of the molten metal there should be an excess in the quantity of glass, it only thickens the cover in the central part covered by the end of the plunger, the remainder of the plate of the covers being uniformly of the same thickness, and consequently not injured by variations in the charges. As the whole force of the plunger is exerted upon the glass beneath its end, the latter is spread out firmly from the center in all directions to the periphery of the chamber of the mold, whereby a very solid cover is produced. Then, before the plunger is withdrawn, the sleeve D is partially turned around, so as to elevate it in the follower and release its screw-threads $b\ b$ from the molded cover. The retaining of the plunger in its lowest position, whereby its lower end is firmly held on the cover beneath, prevents the latter turning around in the mold; thereby that important difficulty incidental to the usual mode of forming the cover is overcome.

I have described my improvement as applied to the formation of the covers of fruit-jars; but it will readily appear that it is equally applicable to the molding of insulators and other articles which have chambers provided with female screw-threads.

I claim as my invention—

1. A sleeve having one or more screw-threads for forming the female screw-threads of fruit-jar covers, insulators, and other articles, combined with a mold in any suitable manner, and with a plunger working within the sleeve to press the molten glass between the formative part of the sleeve and the inner surface of the mold, substantially as set forth.

2. The sleeve D, having a carrying screw-thread, $a$, and one or more formative screw-threads, $b$, in combination with the follower B, having a screw-thread, $a'$, around its central eye, and with the mold A, the sleeve having a central plunger, C, arranged and operating substantially as and for the purpose set forth.

3. The combination of the sleeve D, having one or more formative screw-threads, $b$, and a carrying screw-thread, $a$, with the mold A and the follower B, whereby, the sleeve being screwed down to its lowest position before the pressure of the plunger, an accurate thickness is given to all that part of the article being molded around the end of the plunger, and the superfluous material finds its way to the central part in contact with the end of the plunger, substantially as and for the purpose set forth.

THEODORE F. WOODWARD.

Witnesses:
 THOMAS J. BEWLEY,
 STEPHEN USTICK.